United States Patent
Lee et al.

(10) Patent No.: US 9,348,388 B2
(45) Date of Patent: May 24, 2016

(54) POWER MANAGEMENT SYSTEMS FOR ACCEPTING ADAPTER AND SOLAR POWER IN ELECTRONIC DEVICES

(75) Inventors: Kisun Lee, Cupertino, CA (US); Manisha P. Pandya, Sunnyvale, CA (US); Shimon Elkayam, San Jose, CA (US)

(73) Assignee: Apple Inc., Cupertino, CA (US)

( * ) Notice: Subject to any disclaimer, the term of this patent is extended or adjusted under 35 U.S.C. 154(b) by 300 days.

(21) Appl. No.: 13/597,452

(22) Filed: Aug. 29, 2012

(65) Prior Publication Data

US 2013/0290743 A1    Oct. 31, 2013

Related U.S. Application Data

(60) Provisional application No. 61/639,735, filed on Apr. 27, 2012.

(51) Int. Cl.
*G06F 1/00* (2006.01)
*G06F 1/26* (2006.01)

(52) U.S. Cl.
CPC .............. *G06F 1/263* (2013.01); *Y10T 307/696* (2015.04)

(58) Field of Classification Search
CPC .......... H02J 7/0052; H02J 3/383; H02J 3/385
USPC .................. 713/300; 320/101, 107
See application file for complete search history.

(56) References Cited

U.S. PATENT DOCUMENTS

| | | | | |
|---|---|---|---|---|
| 2004/0207366 | A1* | 10/2004 | Sung | 320/140 |
| 2008/0036440 | A1* | 2/2008 | Garmer | 323/299 |
| 2008/0111517 | A1* | 5/2008 | Pfeifer et al. | 320/101 |
| 2009/0072782 | A1* | 3/2009 | Randall | 320/107 |
| 2010/0301797 | A1* | 12/2010 | Schultz | 320/101 |
| 2011/0266993 | A1* | 11/2011 | Vaish | 320/101 |
| 2012/0025752 | A1* | 2/2012 | Teggatz et al. | 320/101 |
| 2012/0176078 | A1* | 7/2012 | English et al. | 320/101 |
| 2012/0187897 | A1* | 7/2012 | Lenk et al. | 320/101 |
| 2012/0265354 | A1* | 10/2012 | Zhao | 700/286 |
| 2012/0268063 | A1* | 10/2012 | Qiu et al. | 320/107 |
| 2012/0274263 | A1* | 11/2012 | Kung et al. | 320/101 |

OTHER PUBLICATIONS

Hohm, D.P. and M.E. Ropp, "Comparative Study of Maximum Power Point Tracking Algorithms." Progress in Photovoltaics: Research and Applications, vol. 11, pp. 47-62 (2003).†

"Synchronous Switch-Mode Battery Charge Controller for Solar Power with Maximum Power Point Tracking." Texas Instruments. pp. 1-33. (Jul. 2010).†

Liu, Fangrui, Shanxu Duan, Fei Liu, Bangyun Liu, and Yong Kang. "A Variable Step Size INC MPPT Method for PV Systems." IEEE Transactions on Industrial Electronics, vol. 55, No. 7, pp. 2622-2626, Jul. 2008.†

(Continued)

*Primary Examiner* — Vincent Tran
(74) *Attorney, Agent, or Firm* — Blank Rome LLP

(57) ABSTRACT

The disclosed embodiments provide a power management system that supplies power to components in an electronic device. The power management system includes a system microcontroller (SMC) and a charger. During operation, the power management system accepts power from at least one of a power adapter and a solar panel. Next, the power management system supplies the power to components in the electronic device without using a converter circuit between the solar panel and the power management system.

28 Claims, 6 Drawing Sheets

(56) References Cited

OTHER PUBLICATIONS

Liu, Fangrui, Shanxu Duan, Fei Liu, Bangyun Liu, and Yong Kang. ?A Variable Step Size INC MPPT Method for PV Systems.? IEEE Transactions on Industrial Electronics, vol. 55, No. 7, pp. 2622-2626, Jul. 2008.†

Byrne, Ciara, "Intivation gives boost to solar-powered phones." pp. 1-4. Venture Beat. Jun. 2, 2010, 12:28 pm. http://venturebeat.com/2010/06/02/intivation-gives-boost-to-solar-powered-phones.†

Patel, Ashaben Mehut, "Current Measurement in Power Electronic and Motor Drive Applications: A Comprehensive Study." pp. 1-123. (2007) (Masters dissertation, University of Missouri-Rotta).†

\* cited by examiner
† cited by third party

POWER MANAGEMENT SYSTEMS FOR ACCEPTING ADAPTER AND SOLAR POWER IN ELECTRONIC DEVICES

RELATED APPLICATION

This application hereby claims priority under 35 U.S.C. §119 to U.S. Provisional Application No. 61/639,735, entitled "Power Management Systems for Accepting Adapter and Solar Power in Electronic Devices," by Kisun Lee, Manisha P. Pandya and Shimon Elkayam, filed 27 Apr. 2012.

BACKGROUND

1. Field

The disclosed embodiments relate to power sources for electronic devices. More specifically, the disclosed embodiments relate to power management systems in electronic devices for accepting power from power adapters and/or solar panels.

2. Related Art

Rechargeable batteries are presently used to provide power to a wide variety of portable electronic devices, including laptop computers, tablet computers, mobile phones, personal digital assistants (PDAs), digital music players, and cordless power tools. The most commonly used type of rechargeable battery is a lithium battery, which can include a lithium-ion or a lithium-polymer battery.

During operation, a portable electronic device may be connected to a power adapter that converts alternating current (AC) mains electricity into direct current (DC) and/or a voltage compatible with the battery and/or components of the portable electronic device. Power from the power adapter may then be used to charge the battery and/or supply power to components in the portable electronic device. In the absence of the power adapter and/or mains electricity, the portable electronic device may be powered by the battery until the battery is fully discharged. Because the battery has a limited runtime, operation of the portable electronic device may generally be dependent on the availability of mains electricity.

Hence, use of portable electronic devices may be facilitated by improving access to power sources for the portable electronic devices.

SUMMARY

The disclosed embodiments provide a power management system that supplies power to components in an electronic device. The power management system includes a system microcontroller (SMC) and a charger. During operation, the power management system accepts power from at least one of a power adapter and a solar panel. Next, the power management system supplies the power to components in the electronic device without using a converter circuit between the solar panel and the power management system.

In some embodiments, using the power management system to supply the power to the components involves tracking a maximum power point of the solar panel.

In some embodiments, tracking the maximum power point of the solar panel involves measuring one or more output powers associated with at least one of the solar panel and the power management system, and adjusting an input voltage of the power management system based on the one or more output powers. For example, the input voltage may be adjusted based on the output power(s) using a perturb-and-observe technique and/or an incremental conductance technique.

In some embodiments, measuring the one or more output powers involves at least one of:
(i) calculating a first output power of the solar panel based on the input voltage and an input current to the power management system; and
(ii) tracking a second output power of the power management system by measuring an inductor current of an inductor in the power management system.

In some embodiments, the first output power is calculated using a system microcontroller (SMC) of the power management system, and the second output power is tracked using a charger of the power management system.

In some embodiments, the charger includes an analog circuit. The analog circuit may track the maximum power point of the solar panel at a much faster rate than the SMC.

In some embodiments, adjusting the output voltage of the power management system based on the one or more output powers involves at least one of:
(i) adjusting the input voltage at a first rate and a first step size based on the first output power; and
(ii) adjusting the input voltage at a second rate that is higher than the first rate and a second step size that is smaller than the first step size based on the second output power.

In some embodiments, the inductor current is measured using at least one of a DCR sensing technique, a resistor sensing technique, a transformer sensing technique, a field effect transistor (FET) sensing technique, and an on-resistance sensing technique.

In some embodiments, the electronic device is at least one of a laptop computer, a tablet computer, a portable media player, and a mobile phone.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
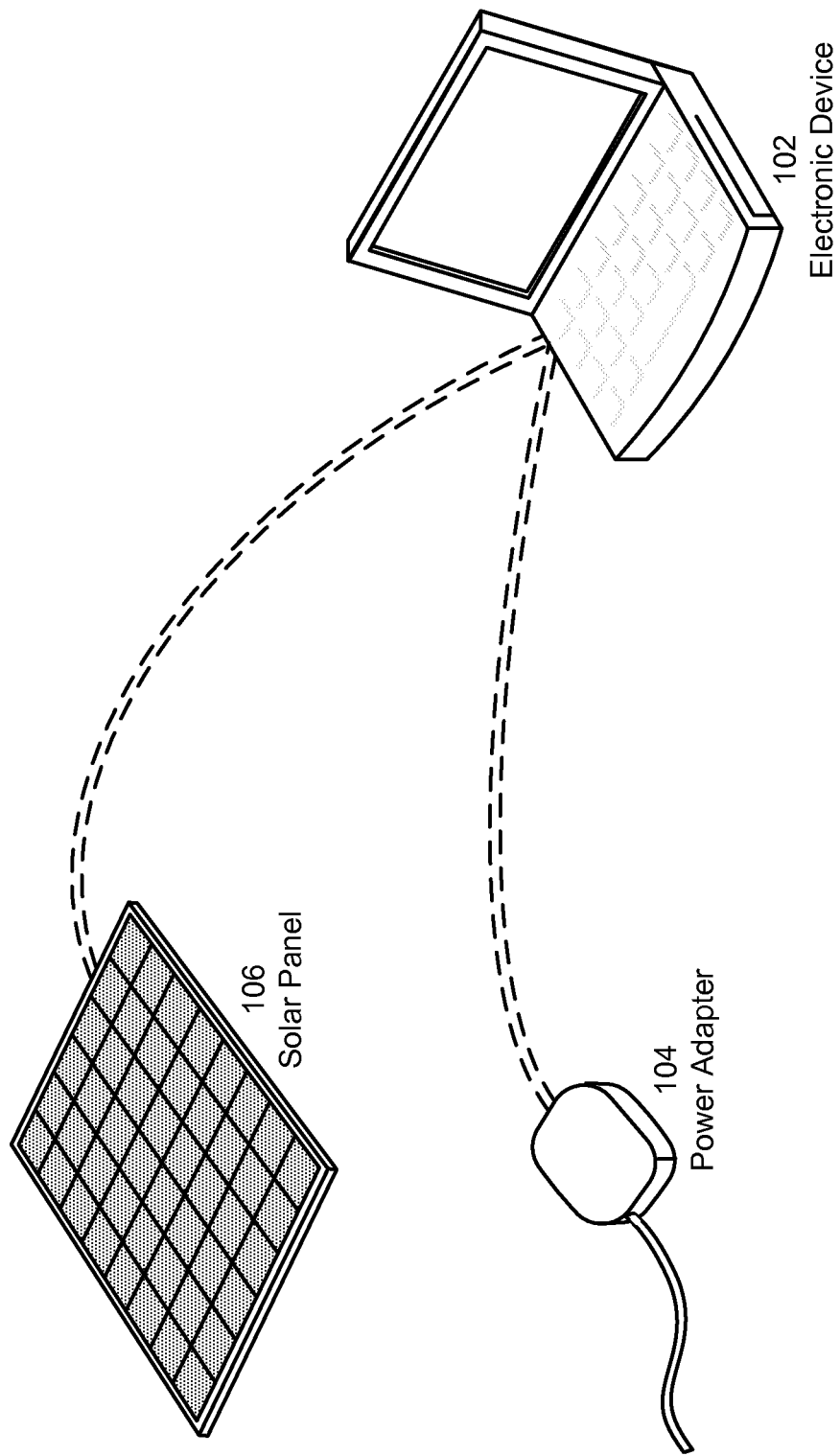
FIG. 1 shows a schematic of a system in accordance with the disclosed embodiments.

The disclosed embodiments provide a method and system for supplying power to components in an electronic device such as a personal computer, laptop computer, tablet computer, personal digital assistant (PDA), mobile phone, and/or portable media player. As shown in FIG. 1, an electronic device 102 may be connected to an external power adapter 104 that converts alternating current (AC) mains electricity into direct current (DC) and/or a voltage that can be used to charge a battery of electronic device 102 and/or operate components in electronic device 102. For example, electronic device 102 may be connected to power adapter 104 using a Universal Serial Bus (USB) connector, MagSafe (MagSafe™ is a registered trademark of Apple Inc.) connector, and/or other type of power connector.

However, power adapter 104 may only supply power to the battery and/or components of electronic device 102 while power adapter 104 is connected to mains electricity (e.g., through a power outlet). In the absence of power adapter 104 and/or mains electricity, electronic device 102 may be powered by the battery until the battery is fully discharged. Consequently, electronic device 102 may have limited operability if mains power and/or power adapter 104 are unavailable for extended periods.

In one or more embodiments, electronic device 102 includes functionality to accept power from a solar panel 106 in lieu of and/or in addition to power from power adapter 104. Like power adapter 104, solar panel 106 may connect to electronic device 102 through a USB connector, MagSafe connector, and/or other power connector. Electricity from solar panel 106 may then be used to charge the battery in electronic device 102 and/or power the components of electronic device 102. For example, solar panel 106 may supply power to electronic device 102 through a MagSafe connector if power adapter 104 and/or mains electricity are not available. On the other hand, both solar panel 106 and power adapter 104 may be connected to electronic device 102 through separate USB interfaces and supply power to the battery and/or components of electronic device 102 at the same time.

In addition, a power management system in electronic device 102 may be configured to accept power from solar panel 106 without using a converter circuit between solar panel 106 and the power management system. In other words, the power management system may operate within electronic device 102 to convert power from solar panel 106 into a voltage, current, and/or form that are compatible with the battery and/or components of electronic device 102. The power management system may thus increase the portability of electronic device 102 while facilitating access to an alternative power source (e.g., solar panel 106) for electronic device 102. Power management systems for supplying power from solar panels to components of electronic devices are described in further detail below with respect to FIGS. 2-4.

Figure 2:
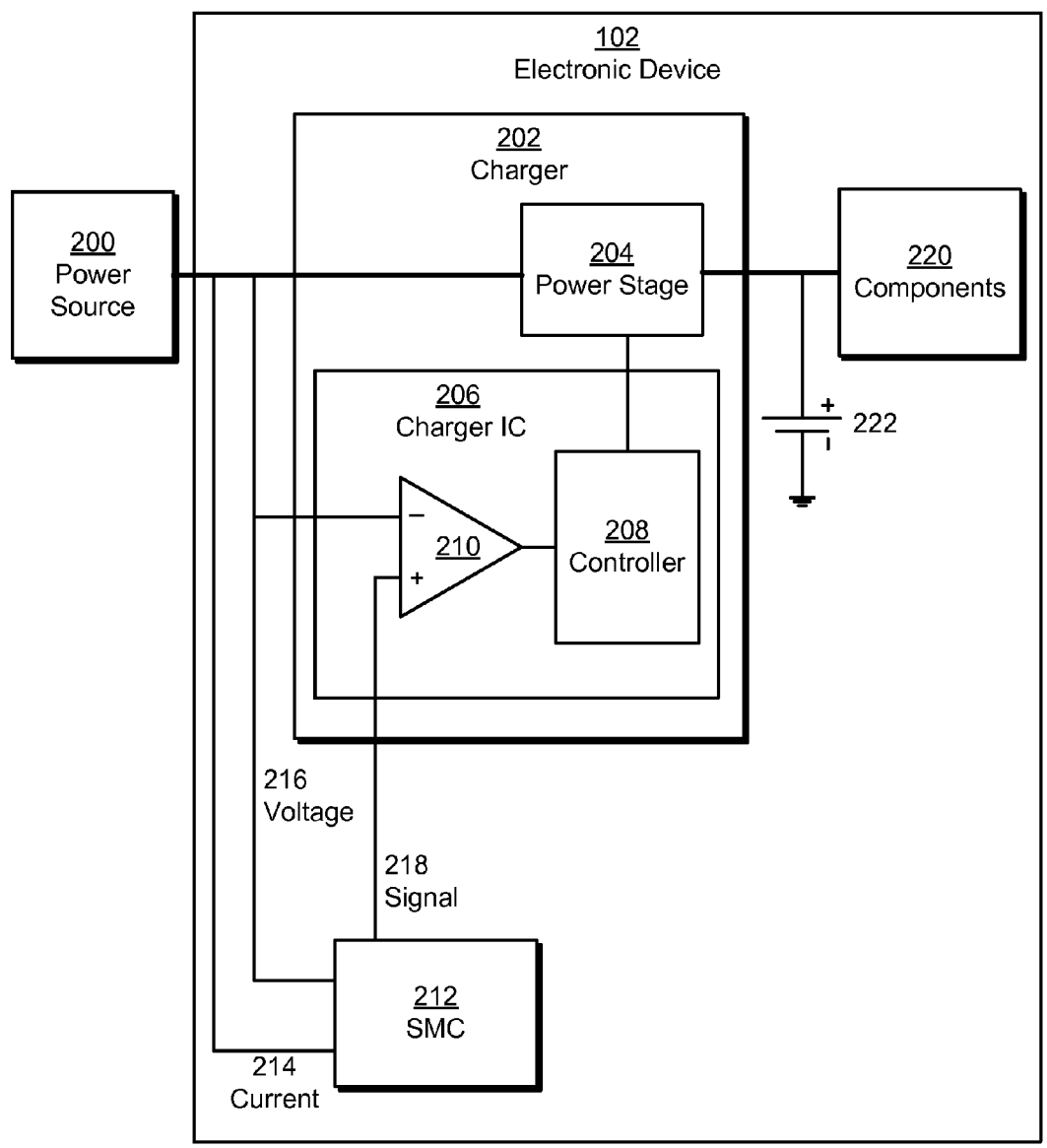
FIG. 2 shows a power management system for supplying power to components in an electronic device in accordance with the disclosed embodiments.

FIG. 2 shows a power management system for supplying power to components in electronic device 102 in accordance with the disclosed embodiments. As mentioned above, the power management system may accept power from a power source 200 such as a power adapter (e.g., power adapter 104 of FIG. 1) or solar panel (e.g., solar panel 106 of FIG. 1). The power management system may then supply the power to a battery 222 and/or a set of components 220 (e.g., processor, memory, display, keyboard, radio, etc.) in electronic device 102 without using a converter circuit between the solar panel and the power management system.

As shown in FIG. 2, the power management system includes a charger 202 and a system microcontroller (SMC) 212. Charger 202 includes a power stage 204 and a charger integrated circuit (IC) 206 that process electricity from power source 200 into a form (e.g., voltage, current, DC, etc.) that is compatible with components 220 and/or battery 222. For example, power stage 204 may include an inductor, a capacitor, one or more field effect transistors (FETs), and/or other components of a buck converter. Charger IC 206 may include a controller 208 that implements an input current loop, a battery current loop, an output voltage loop, and/or an input voltage loop for controlling the charging of battery 222 and/or powering of components 220 using power from power source 200.

SMC 212 may monitor and/or manage the charging of battery 222 and/or powering of components 220 using power from power source 200. For example, SMC 212 may correspond to a microprocessor that assesses the availability and type (e.g., power adapter, solar panel) of power source 200, as well as the state of charge, capacity, and/or health of battery 222. SMC 212 may then manage the charging or discharging of battery 222 and/or powering of components 220 based on the assessment of power source 200 and battery 222.

In one or more embodiments, charger 202 and SMC 212 supply power from the solar panel to components 220 and/or battery 222 by tracking a maximum power point of the solar panel. First, SMC 212 may calculate an output power of the solar panel from an input current 214 and an input voltage 216 to the power management system. For example, SMC 212 may obtain the output power of the solar panel by multiplying current 214 and voltage 216.

Next, SMC 212 may generate a signal 218 that is used by charger 202 to adjust voltage 216. Signal 218 and voltage 216 may be received by an operational amplifier (op-amp) 210 in charger IC 206 and used in the input voltage loop to optimize the processing of power from the solar panel. For example, signal 218 may be used by charger IC 206 to update a reference voltage (e.g., maximum power point voltage) of the input voltage loop using a perturb-and-observe technique, an incremental conductance technique, and/or another maximum point power tracking (MPPT) technique. Conversely, if power source 200 is a power adapter, charger IC 206 may disable the input voltage loop and use the input current loop, battery current loop, and output voltage loop to supply power from the power adapter to components 220 and/or battery 222.

Those skilled in the art will appreciate that MPPT of the solar panel may be adversely impacted by the rate at which SMC 212 updates signal 218. For example, SMC 212 may correspond to a low-power microprocessor that is not capable of updating signal 218 more than once every second. As a result, SMC 212 may be too slow to efficiently and/or effectively track the maximum power point of the solar panel. To mitigate issues associated with implementing MPPT on SMC 212, MPPT may also be performed by charger 202, as discussed in further detail below with respect to FIG. 3.

Figure 3:
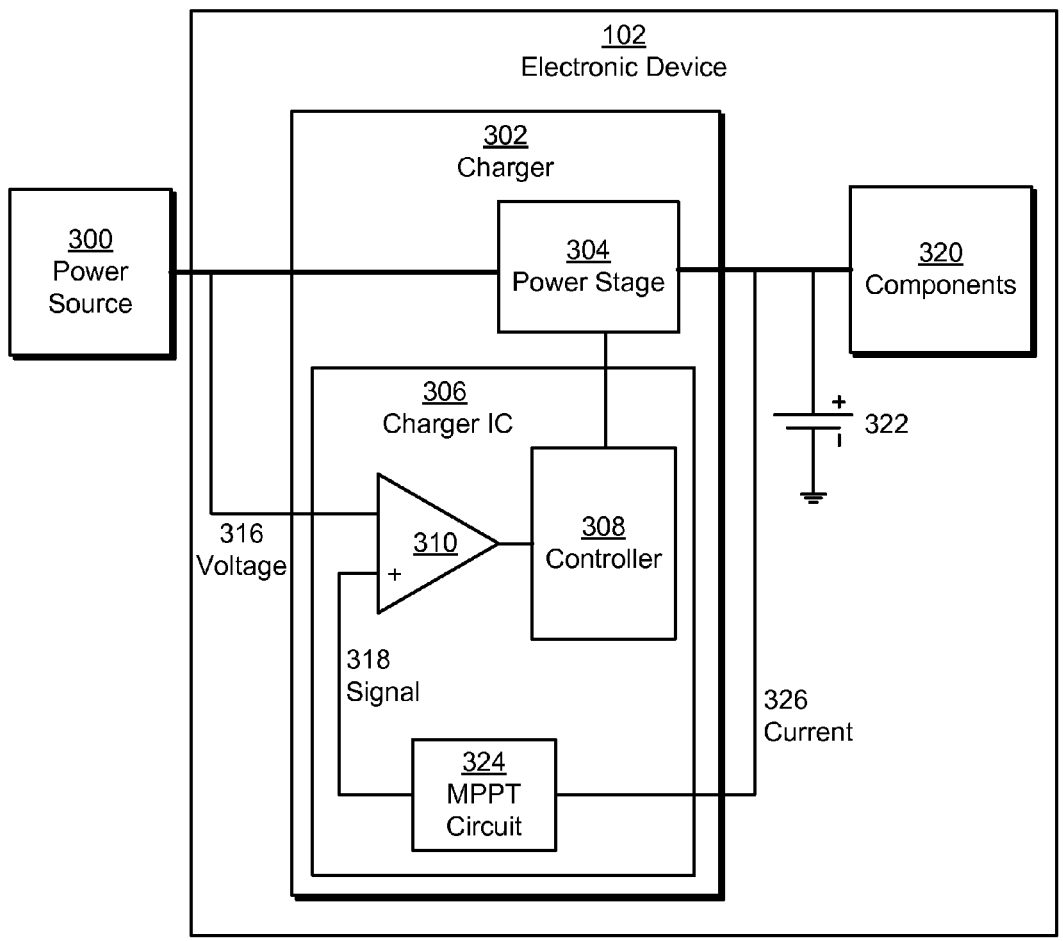
FIG. 3 shows a power management system for supplying power to components in an electronic device in accordance with the disclosed embodiments.

FIG. 3 shows a power management system for supplying power to components in electronic device 102 in accordance with the disclosed embodiments. Like the power management system of FIG. 2, the power management system of FIG. 3 accepts power from a power source 300, such as a power adapter and/or solar panel, and supplies the power to components 320 and/or a battery 322 of electronic device 102. However, MPPT for the solar panel may be performed by a charger 302 in the power management system instead of an SMC (e.g., SMC 212 of FIG. 2).

As shown in FIG. 3, charger 302 includes a power stage 304 and a charger IC 306. Power stage 304 may include an inductor, a capacitor, one or more FETs, and/or other components of a buck converter that converts power from power source 300 into a form that can be used to charge battery 322 and/or operate components 320.

Within charger IC 306, a MPPT circuit 324 may track an output power of the power management system by measuring an inductor current 326 of the inductor in power stage 304. More specifically, the output power of the power management system may be calculated as the product of the output voltage and output current of the power management system. Assuming the buck converter in power stage 304 operates in steady state, the output current of the power management system equals current 326. In addition, the output voltage of the power management system may be coupled to the voltage of battery 322, which changes very slowly. Thus, changes to the output power may be reflected in current 326, assuming the voltage of battery 322 is constant.

Those skilled in the art will appreciate that the power management system and/or MPPT circuit 324 may use a variety of techniques to measure current 326 from the inductor. For example, the power management system and/or MPPT circuit 324 may use a resistor-capacitor (RC) circuit to perform DCR sensing of the voltage across the inductor and calculate current 326 from the measured voltage. Alternatively, the power management system and/or MPPT circuit 324 may measure the on-resistance from drain to source ($R_{DS(on)}$) of a low-side FET in power stage 304 and obtain current 326 from the measured on-resistance. Finally, the power management system and/or MPPT circuit 324 may use a transformer sensing technique and/or a resistor sensing technique to obtain current 326.

Next, MPPT circuit 324 may use current 326 to generate a signal 318 that is inputted to an op-amp 310, along with an input voltage 316 to the power management system. Signal 318 and voltage 316 may then be used by charger IC 306 and/or a controller 308 in charger IC 306 to track the maximum power point of the solar panel. For example, charger IC 306 may adjust a reference voltage of an input voltage loop in charger 302 based on signal 318 and voltage 316.

Because the output power is tracked by measuring a single value (e.g., the inductor current), components such as microprocessors, multipliers, and/or analog-to-digital (A/D) converters may not be required in MPPT circuit 324. Instead, MPPT circuit 324 may be an analog circuit that tracks the maximum power point of the solar panel at a much faster rate than the rate of change of voltage from battery 322 and/or the rate at which the SMC performs MPPT. In addition, MPPT circuit 324 may track the maximum output power point of the power management system, which may be more accurate than tracking of the maximum input power point of the power management system (e.g., using the SMC). Finally, MPPT may be performed by both MPPT circuit 324 and the SMC to further facilitate power production using the solar panel, as discussed in further detail below with respect to FIG. 4.

Figure 4:
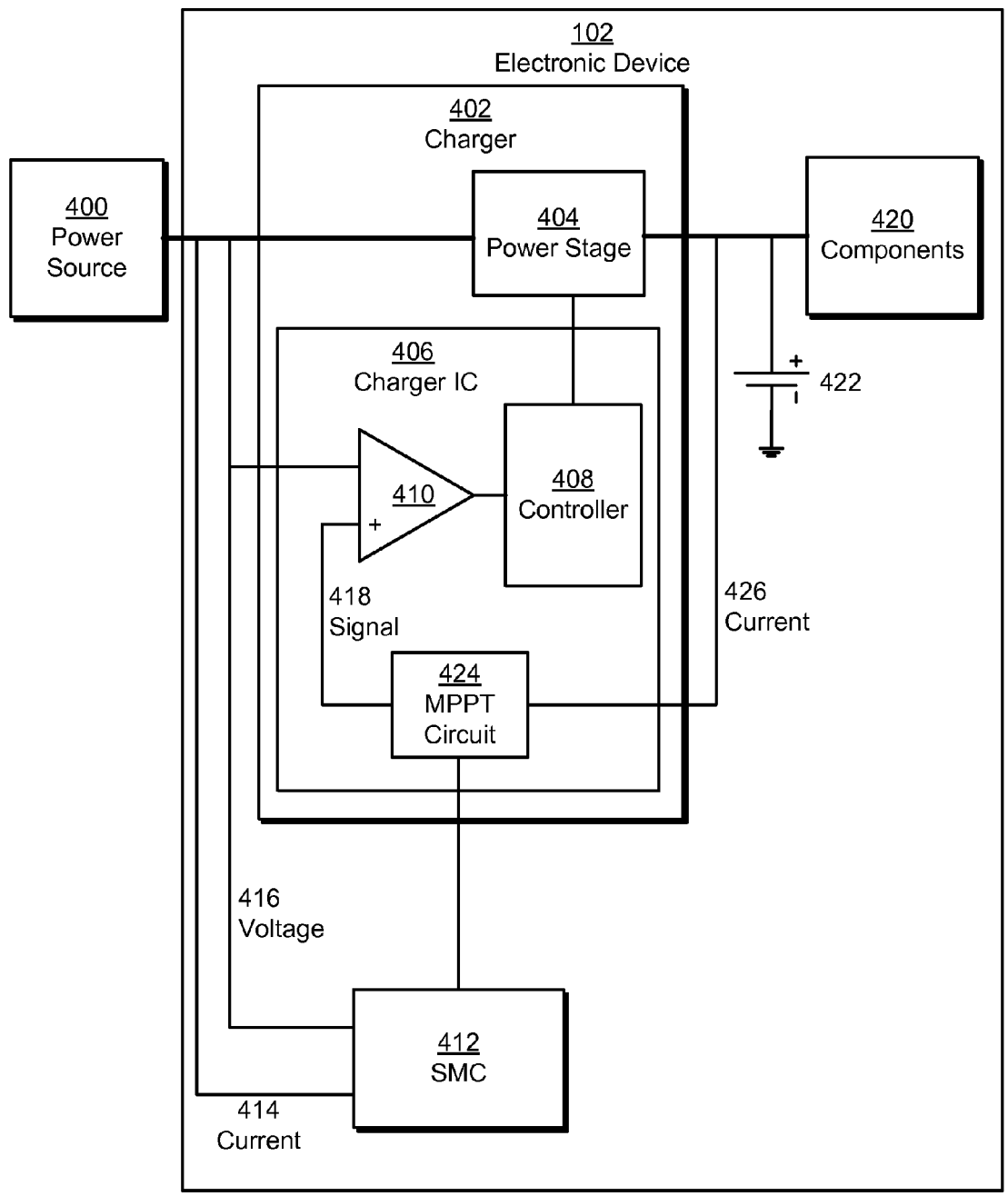
FIG. 4 shows a power management system for supplying power to components in an electronic device in accordance with the disclosed embodiments.

FIG. 4 shows a power management system for supplying power to components in electronic device 102 in accordance with the disclosed embodiments. The power management system of FIG. 4 may accept power from a power source 400 such as a power adapter and/or solar panel. If the solar panel is connected to electronic device 102, a charger 402 and/or an SMC 412 in the power management system may track the maximum power point of the solar panel and supply the power to a set of components 420 and/or a battery 422 in electronic device 102 without using a converter circuit between the solar panel and the power management system.

In particular, SMC 412 may calculate a first output power of the solar panel based on an input voltage 416 and an input current 414 to the power management system, as discussed above with respect to FIG. 2. SMC 412 may then adjust voltage 416 at a first rate and a first step size based on the first output power. For example, SMC 412 may use an incremental conductance technique to precisely set the maximum power point of the solar panel at a relatively slow rate, thus enabling periodic precise adjustments to the output voltage of the power management system and/or maximum power point.

Charger 402 may track a second output power of the power management system by measuring an inductor current 426 of an inductor in a power stage 404 of charger 402, as discussed above with respect to FIG. 3. An MPPT circuit 424 (e.g., an analog circuit) in charger 402 may then adjust voltage 416 at a second rate and a second step size based on the second output power. In addition, the second rate may be higher than the first rate, and the second step size may be smaller than the first step size.

By making frequent, fine-grained adjustments to voltage 416, MPPT circuit 424 may facilitate accurate tracking of the solar panel's maximum power point in between larger, less frequent adjustments to voltage 416 by SMC 412. For example, changes to the output voltage from SMC 412 may be received every second by MPPT circuit 424 and transmitted using a signal 418 to an op-amp 410 in a charger IC 406 of charger 402. Charger IC 406 and/or a controller 408 in charger IC 406 may then use signal 418 and voltage 416 to precisely update the reference voltage of an input voltage loop implemented by charger IC 406. While SMC 412 calculates the next adjustment to voltage 416 using current 414 and voltage 416, MPPT circuit 424 may measure current 426 and incrementally update signal 418 based on current 426.

To further facilitate tracking of the maximum power point, SMC 412 and MPPT circuit 424 may coordinate adjustments to voltage 416. For example, the step size and/or rate used by MPPT circuit 424 to adjust voltage 416 may be based on the technique (e.g., perturb-and-observe, incremental conductance, etc.), step size, and/or rate used by SMC 412 to adjust voltage 416. Alternatively, SMC 412 and MPPT circuit 424 may execute independently from one another and adjust voltage 416 based on current 414, voltage 416, and/or current 426.

As mentioned above, the solar panel may operate as power source 400 to electronic device 102 without requiring an additional converter circuit between the solar panel and the power management system. Instead, existing parts of the power management system (e.g., charger 402, SMC 412) may be modified to convert power from the solar panel and perform MPPT on the power. In turn, the power management system may represent a size and/or weight savings over conventional power management systems that connect power sources directly to components in electronic devices and require separate (e.g., external) converter circuits to convert power from solar panels into a form that can be used by the components.

Figure 5:
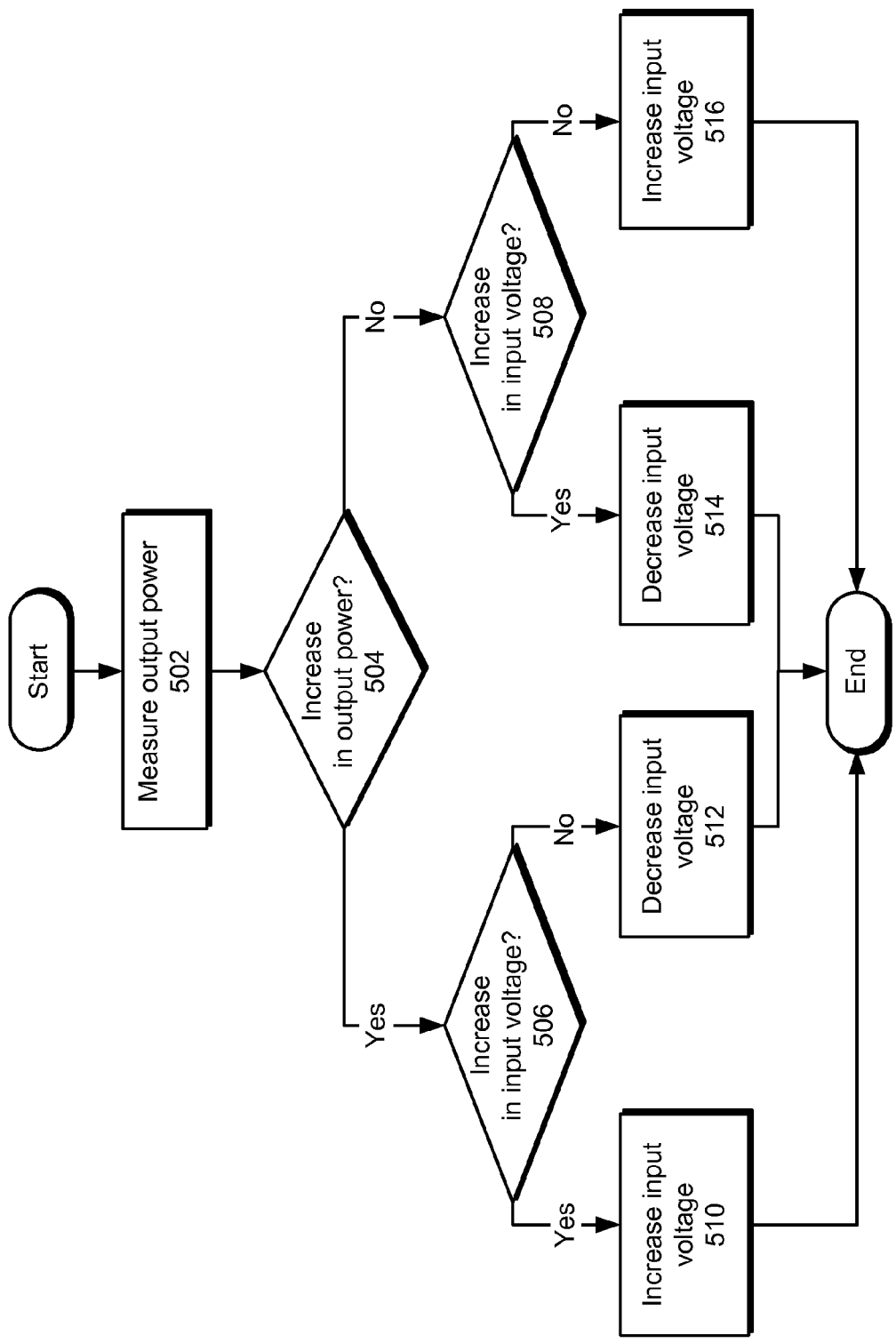
FIG. 5 shows a flowchart illustrating the process of tracking a maximum power point of a solar panel in accordance with the disclosed embodiments.

FIG. 5 shows a flowchart illustrating the process of tracking a maximum power point of a solar panel in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, an output power of the solar panel and/or a power management system that accepts power from the solar panel is measured (operation 502). The output power may be calculated based on an input voltage and input current to the power management system. For example, the output power may be calculated as the product of the input voltage and the input current. Alternatively, the output power may be tracked by measuring an inductor current of an inductor in the power management system. For example, the inductor current may be obtained using a DCR sensing technique, a resistor sensing technique, a transformer sensing technique, a FET sensing technique, and/or an on-resistance (e.g., $R_{DS(on)}$) sensing technique.

Tracking of the maximum power point may be based on changes to the output power and/or input voltage to the power management system (operation 504-508). If the output power has increased, the input voltage may be adjusted in the same direction as that of the previous iteration of MPPT. In particular, the input voltage may be increased (operation 510) if the input voltage was increased in the previous MPPT iteration and decreased (operation 512) if the input voltage was decreased in the previous MPPT iteration.

Conversely, if the output power has decreased, the input voltage may be adjusted in the opposite direction from that of the previous MPPT iteration. In other words, the input voltage may be decreased (operation 514) if the input voltage was increased in the previous MPPT iteration and increased (operation 516) if the input voltage was decreased in the previous MPPT iteration.

The change in input voltage may additionally be based on the technique used to measure the output power in operation 502 and/or track the maximum power point of the solar panel. For example, a perturb-and-observe technique may adjust the input voltage using a relatively large step size if the output power is calculated from the input voltage and input current. On the other hand, the perturb-and-observe technique may adjust the input voltage using a relatively small step size if the output power is tracked using the inductor current. Finally, an incremental conductance technique may precisely calculate the step size required to adjust the input voltage so that the solar panel is operating at the maximum power point.

Figure 6:
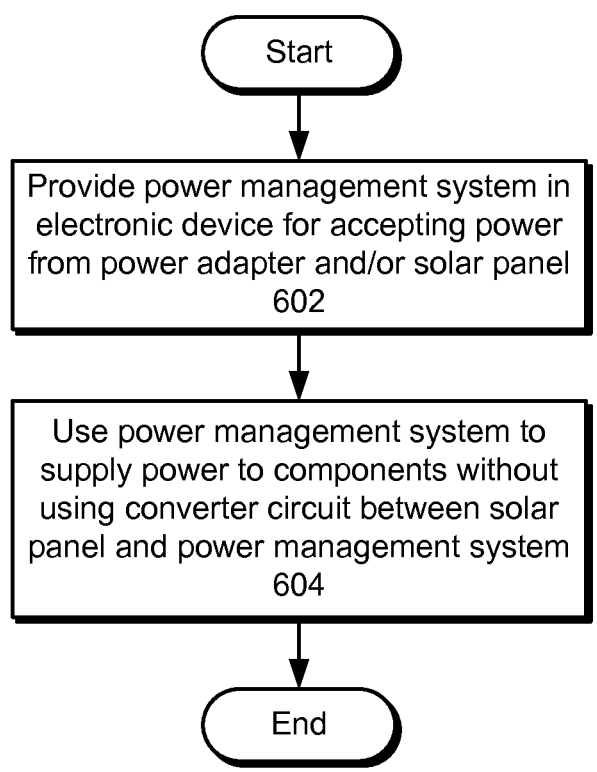
FIG. 6 shows a flowchart illustrating the process of supplying power to components in an electronic device in accordance with the disclosed embodiments.

FIG. 6 shows a flowchart illustrating the process of supplying power to components in an electronic device in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a power management system is provided in the electronic device for accepting power from a power adapter and/or a solar panel (operation 602). The power management system may include an SMC and a charger. Next, the power management system is used to supply power to the components without using a converter circuit between the solar panel and the power management system (operation 604). For example, the SMC and/or charger may convert power from the solar panel into a form that is compatible with the battery and/or components, thus enabling omission of the converter circuit between the solar panel and power management system.

The SMC and/or charger may also track the maximum power point of the solar panel. For example, the SMC and/or charger may measure one or more output powers associated with at least one of the solar panel and the power management system and adjust an input voltage of the power management system based on the one or more output powers. The SMC may calculate a first output power of the solar panel based on the input voltage and an input current to the power management system, and an analog circuit in the charger may track a second output power of the power management system by measuring an inductor current of an inductor in the power management system. The SMC may then adjust the input voltage at a first rate and a first step size based on the first output power, and the analog circuit may adjust the input voltage at a second rate that is higher than the first rate and a second step size that is smaller than the first step size based on the second output power.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for supplying power to components in an electronic device, comprising:
   providing a power management system in the electronic device for accepting power from at least one of a power adapter and a solar panel; and
   using the power management system to supply the power to the components without using a converter circuit between the solar panel and the power management system, wherein an input voltage of the power management system is adjusted based on two output powers of the power management system, and wherein the input voltage is determined based at least on an inductor current of an inductor within a power converter in the power management system.

2. The method of claim 1, wherein using the power management system to supply the power to the components involves:
   tracking a maximum power point of the solar panel.

3. The method of claim 2, wherein tracking the maximum power point of the solar panel involves:
   measuring one or more output powers associated with at least one of the solar panel and the power management system; and
   adjusting the input voltage of the power management system based on the output powers.

4. The method of claim 3, wherein measuring the one or more output powers involves at least one of:
  calculating a first output power of the solar panel based on the input voltage and the input current to the power management system; and
  tracking a second output power of the power management system by measuring the inductor current of the inductor in the power management system.

5. The method of claim 4, wherein the first output power is calculated using a system microcontroller of the power management system, and wherein the second output power is tracked using a charger of the power management system.

6. The method of claim 5, wherein the charger comprises an analog circuit.

7. The method of claim 4, wherein adjusting the input voltage of the power management system based on the one or more output powers involves at least one of:
  adjusting the input voltage at a first rate and a first step size based on the first output power; and
  adjusting the input voltage at a second rate that is higher than the first rate and a second step size that is smaller than the first step size based on the second output power.

8. The method of claim 4, wherein the inductor current is measured using at least one of:
  a DCR sensing technique;
  a resistor sensing technique;
  a transformer sensing technique;
  a field effect transistor sensing technique; and
  an on-resistance sensing technique.

9. The method of claim 1, wherein the electronic device is at least one of a laptop computer, a tablet computer, a portable media player, and a mobile phone.

10. A power management system in an electronic device, comprising:
  a system microcontroller; and
  a charger,
  wherein the power management system is configured to:
    accept power from at least one of a power adapter and a solar panel; and
    supply the power to components in the electronic device without using a converter circuit between the solar panel and the power management system, wherein an input voltage of the power management system is adjusted based on two output powers of the power management system, and wherein the input voltage is determined based at least on an inductor current of an inductor within a power converter in the power management system.

11. The power management system of claim 10, wherein supplying the power to the components involves at least:
  tracking a maximum power point of the solar panel.

12. The power management system of claim 11, wherein tracking the maximum power point of the solar panel involves:
  measuring one or more output powers associated with at least one of the solar panel and the power management system; and
  adjusting the input voltage of the power management system based on the output powers.

13. The power management system of claim 12, wherein measuring the one or more output powers involves at least one of:
  calculating a first output power of the solar panel based on the input voltage and the input current to the power management system; and
  tracking a second output power of the power management system by measuring the inductor current of the inductor in the power management system.

14. The power management system of claim 13, wherein the first output power is calculated using the system microcontroller, and wherein the second output power is tracked using the charger.

15. The power management system of claim 14, wherein the charger comprises an analog circuit.

16. The power management system of claim 13, wherein adjusting the input voltage of the power management system based on the output powers involves at least one of:
  adjusting the input voltage at a first rate and a first step size based on the first output power; and
  adjusting the input voltage at a second rate that is higher than the first rate and a second step size that is smaller than the first step size based on the second output power.

17. The power management system of claim 13, wherein the inductor current is measured using at least one of:
  a DCR sensing technique;
  a resistor sensing technique;
  a transformer sensing technique;
  a field effect transistor sensing technique; and
  an on-resistance sensing technique.

18. A non-transitory computer-readable storage medium storing instructions that when executed by a computer cause the computer to perform a method for supplying power to components in an electronic device, the method comprising:
  providing a power management system in the electronic device for accepting power from at least one of a power adapter and a solar panel; and
  using the power management system to supply the power to the components without using a converter circuit between the solar panel and the power management system, wherein an input voltage of the power management system is adjusted based on two output powers of the power management system, and the input voltage is determined based at least on an inductor current of an inductor within a power converter in the power management system.

19. The non-transitory computer-readable storage medium of claim 18, wherein using the power management system to supply the power to the components involves at least:
  tracking a maximum power point of the solar panel.

20. The non-transitory computer-readable storage medium of claim 19, wherein tracking the maximum power point of the solar panel involves:
  measuring one or more output powers associated with at least one of the solar panel and the power management system; and
  adjusting the input voltage of the power management system based on the output powers.

21. The non-transitory computer-readable storage medium of claim 20, wherein measuring the one or more output powers involves at least one of:
  calculating a first output power of the solar panel based on the input voltage and the input current to the power management system; and
  tracking a second output power of the power management system by measuring the inductor current of the inductor in the power management system.

22. The non-transitory computer-readable storage medium of claim 21, wherein adjusting the output voltage of the power management system based on the output powers involves at least one of:
  adjusting the input voltage at a first rate and a first step size based on the first output power; and adjusting the input voltage at a second rate that is higher than the first rate and a second step size that is smaller than the first step size based on the second output power.

23. The non-transitory computer-readable storage medium of claim 21, wherein the inductor current is measured using at least one of:
    a DCR sensing technique;
    a resistor sensing technique;
    a transformer sensing technique;
    a field effect transistor sensing technique; and
    an on-resistance sensing technique.

24. An electronic device, comprising:
    a set of components powered by at least one of a battery, a power adapter, and a solar panel; and
    a power management system, comprising
    a system microcontroller; and
    a charger,
    wherein the power management system is configured to:
        accept power from at least one of the power adapter and the solar panel; and
        supply the power to at least one of the battery and the components without using a converter circuit between the solar panel and the power management system, wherein an input voltage of the power management system is adjusted based on two output powers of the power management system, which is determined based at least on an inductor current of an inductor within a power converter in the power management system.

25. The electronic device of claim 24, wherein supplying the power to the components involves at least:
    tracking a maximum power point of the solar panel.

26. The electronic device of claim 25, wherein tracking the maximum power point of the solar panel involves:
    measuring one or more output powers associated with at least one of the solar panel and the power management system; and
    adjusting the input voltage of the power management system based on the output powers.

27. The electronic device of claim 26, wherein measuring the output powers involves at least one of:
    calculating a first output power of the solar panel based on the input voltage and the input current to the power management system; and
    tracking a second output power of the power management system by measuring the inductor current of the inductor in the power management system.

28. The electronic device of claim 27, wherein adjusting the output voltage of the power management system based on the output powers involves at least one of:
    adjusting the input voltage at a first rate and a first step size based on the first output power; and
    adjusting the input voltage at a second rate that is higher than the first rate and a second step size that is smaller than the first step size based on the second output power.

* * * * *